UNITED STATES PATENT OFFICE 2,193,228

COPPER CONTAINING AZO DYESTUFFS

Detlef Delfs, Leverkusen-I. G.-Werk, Germany, assignor to General Aniline & Film Corporation, a corporation of Delaware No Drawing. Application October 16, 1937, Serial No. 169,518. In Germany October 30, 1936

5 Claims.  (Cl. 260—145)

The present invention relates to new azo dyestuffs, more particularly it relates to copper compounds of ortho-hydroxy-azo dyestuffs which are obtainable by treating tetrakisazo dyestuffs of the following formula:

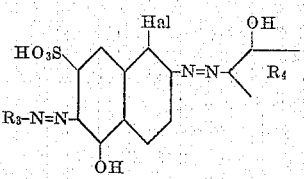

wherein $R_1$ stands for a radical of the benzene or naphthalene series, $R_2$ and $R_3$ stand for radicals of the naphthalene series bearing the azo groups in positions para to another, and $R_4$ stands for a radical of the naphthalene series, which dyestuffs contain at least 3 solubilizing groups, such as sulfonic acid and/or carboxylic acid groups, with an agent yielding copper in a caustic alkaline medium until by substitution of the halogen atom by a hydroxy group the copper complex compound of the corresponding ortho-ortho'-dihydroxy azo dyestuff is formed. The radicals $R_1$, $R_2$, $R_3$ and $R_4$ may be further substituted; thus $R_1$ may be substituted by halogen, alkyl, alkoxy, substituted alkyl and alkoxy, the sulfonic acid group and the carboxylic acid groups, $R_2$ and $R_3$ by the sulfonic acid group and

which stands for the radical of an α- or β-naphthol, by the sulfonic acid group, the carboxylic acid group, a further hydroxyl, alkoxy, the amino group or a substituted amino group.

As agents yielding copper, there may be used finely divided copper or copper compounds generally used in the art of preparing copper containing azo dyestuffs, for instance, copper oxide or hydroxide, copper salts, such as cupric sulfate and cupric chloride, further, the complex compounds of copper with inorganic or organic bases, for example, the complex compounds of cupric sulfate with ammonia, pyridine or ethylene diamine, or further the copper complex compounds of organic hydroxy compounds, for instance, of glycerine or tartaric acid.

The temperature required for performing the process depends upon the specific dyestuff to be coppered, but, as a general rule, it may be stated that the coppering can be performed between about 50° C. and about 120° C. The time required for completing the process also depends upon the specific azo dyestuff to be coppered, and, of course, upon the specific temperature used in such a manner that lower temperatures require a longer time, and vice versa. As stated above the process is complete when all the chlorine in ortho-position with respect to the azo bridge has been split off with the formation of the copper complex compound of the corresponding ortho-hydroxy-azo dyestuff.

The progress of the coppering process can be seen from a change in coloration of the reaction mass, coppering being complete when a change in coloration is no longer detectable.

The new copper containing tetrakisazo dyestuffs, obtainable according to the present invention, are dark powders soluble in water generally with a grey coloration. The new dyestuffs are especially suited for dyeing materials of cellulose and regenerated cellulose, which materials they generally dye grey shades. The dyeings are distinguished by an excellent fastness to light.

The following examples illustrate the invention, the parts being by weight.

*Example 1*

To 1200 parts of the tetrakisazo dyestuff of the following formula:

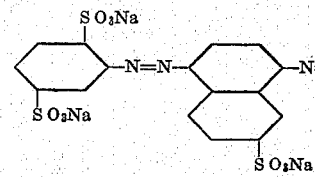 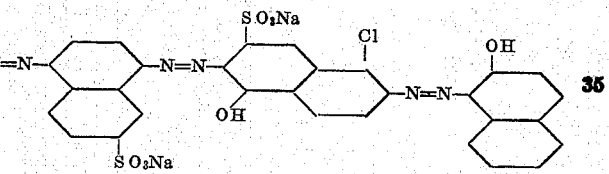

dissolved in 40,000 parts of water at 85° C., an alkaline copper solution prepared from 350 parts of crystallised copper sulfate, 500 parts of glycerine, 1500 parts of water and 1000 parts of caustic soda lye of 38° Bé. are added. This mixture is stirred for 4 hours at 85°–90° C. Then the dyestuff is separated by the addition of sodium chloride and isolated. A dark powder is thus obtained which easily dissolves in water with a bluish-grey shade.

It dyes cotton from the Glauber's salt-soda bath grey shades.

By substituting the aniline-2.5-disulfonic acid, used as initial component, by other initial components of the benzene series, for example, the aniline-2.4- or 3.5-disulfonic acid or the 4- or 5-sulfonic-2-aminobenzoic acid, there are obtained dyestuffs of similar properties, which dye cotton grey shades.

By substituting one of the two 1-naphthylamine-sulfonic acids, used as middle components, by α-naphthylamine, there are also obtained dyestuffs which dye cotton grey shades. As initial component there can also be used the aniline-3-sulfonic acid, and the 1-naphthol-4-sulfonic acid or the 2-naphthol-6-sulfonic acid as final component instead of β-naphthol, without any essential change in the shade.

*Example 2*

By transforming the tetrakisazodyestuff of the following constitution:

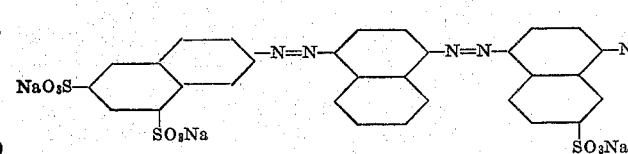

according to the process indicated in Example 1, into the copper complex compound of the corresponding ortho-ortho'-dihydroxy azodyestuff, there is obtained a dyestuff which dyes cellulose fiber reddish grey shades of great fastness to light.

In the examples described above the copper is dissolved in the alkaline medium with the aid of glycerine. Of course, instead of the glycerine many other agents can be used which are capable of yielding, in an alkaline medium with cupric hydroxide, soluble compounds, as, for instance, the salts of tartaric acid. However, solution of the copper is not necessary. In the case of dyestuffs which are difficultly soluble, it may be advantageous to work with the addition of a solvent, such as pyridine. On the other hand, it is often favorable to perform coppering in a dilute solution of a suitable salt.

I claim:

1. As new products, the copper complex compounds of tetrakisazo dyestuffs of the general formula:

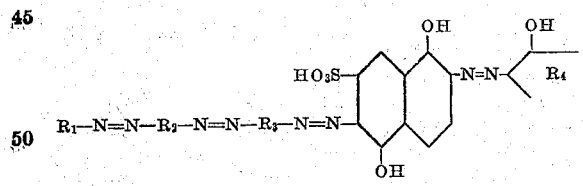

wherein $R_1$ stands for a member selected from the group consisting of benzene and naphthalene radicals bearing acid solubilizing groups, $R_2$ and $R_3$ stand for radicals of the group consisting of naphthalene and naphthalene sulfonic acids bearing the azo groups in positions para to another, $R_4$ stands for a radical of the naphthalene series, these dyestuffs containing at least three acid solubilizing groups being generally dark powders soluble in water and dyeing materials of cellulose or regenerated cellulose in general grey shades of excellent fastness to light.

2. As new products the copper complex compounds of tetrakisazo dyestuffs of the general formula:

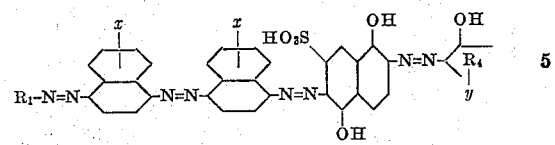

wherein $R_1$ is a benzene radical bearing up to two acid solubilizing groups, at least one of them being a sulfonic acid group, $R_4$ stands for a naphthalene radical, $x$ and $y$ stand for substituents selected from the group consisting of hydrogen and the sulfonic acid group, the $x$'s being attached to one of the β-positions and at least one of the $x$'s being a sulfonic acid group, being generally dark powders soluble in water and dyeing materials of cellulose or regenerated cellulose in general grey shades of excellent fastness to light.

3. As new products the copper complex compounds of tetrakisazo dyestuffs of the general formula:

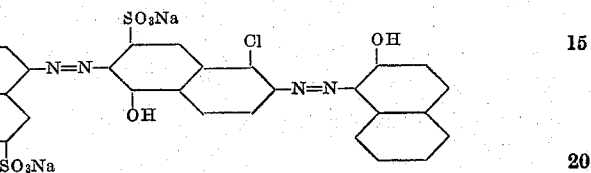

wherein $R_1$ is a naphthalene radical bearing up to two sulfonic acid groups, $R_4$ stands for a naphthalene radical, $x$ and $y$ stand for substituents selected from the group consisting of hydrogen and the sulfonic acid group, the $x$'s being attached to one of the β-positions and at least one of the $x$'s being a sulfonic acid group, being generally dark powders soluble in water and dyeing materials of cellulose or regenerated cellulose in general grey shades of excellent fastness to light.

4. As a new product the copper complex compound of the tetrakisazo dyestuff of the formula:

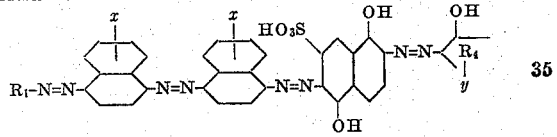

being easily soluble in water with bluish-grey coloration and dyeing cotton grey shades of excellent fastness to light.

5. As a new product the copper complex compound of the tetrakisazo dyestuff of the formula:

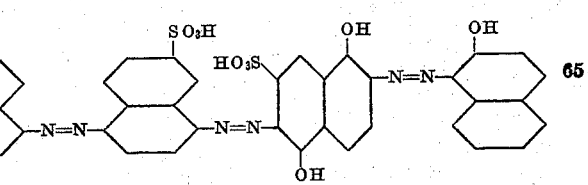

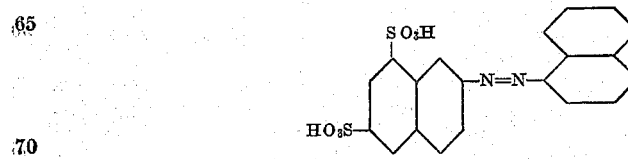

being easily soluble in water with grey coloration and dyeing cellulosic fibers reddish-grey shades of excellent fastness to light.

DETLEF DELFS.